United States Patent
Kuzuhara et al.

(10) Patent No.: US 11,703,683 B2
(45) Date of Patent: Jul. 18, 2023

(54) HEAD-UP DISPLAY AND MOBILE BODY EQUIPPED WITH HEAD-UP DISPLAY

(71) Applicant: Panasonic Intellectual Property Management Co., Ltd., Osaka (JP)

(72) Inventors: Satoshi Kuzuhara, Osaka (JP); Hiroaki Okayama, Nara (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 488 days.

(21) Appl. No.: 17/060,706

(22) Filed: Oct. 1, 2020

(65) Prior Publication Data
US 2021/0018750 A1 Jan. 21, 2021

Related U.S. Application Data

(63) Continuation of application No. PCT/JP2019/007246, filed on Feb. 26, 2019.

(30) Foreign Application Priority Data

May 31, 2018 (JP) .................................. 2018-105383

(51) Int. Cl.
- *G02B 27/01* (2006.01)
- *B60K 35/00* (2006.01)

(Continued)

(52) U.S. Cl.
CPC .......... *G02B 27/0101* (2013.01); *B60K 35/00* (2013.01); *G02B 13/18* (2013.01);
(Continued)

(58) Field of Classification Search
CPC ..... G02B 27/00–648; G02B 2027/0105–0198; G02B 5/00–32;
(Continued)

(56) References Cited

U.S. PATENT DOCUMENTS

| 2016/0134848 | A1* | 5/2016 | Watanabe | H04N 9/317 345/7 |
| 2017/0092169 | A1* | 3/2017 | Kuzuhara | G09G 3/007 |

(Continued)

FOREIGN PATENT DOCUMENTS

| JP | 2017-219755 | 12/2017 |
| WO | 2018/066062 | 4/2018 |

OTHER PUBLICATIONS

Extended European Search Report dated Jun. 25, 2021 in corresponding European Patent Application No. 19812085.9.

(Continued)

*Primary Examiner* — Bao-Luan Q Le
*Assistant Examiner* — Christopher A Lamb, II
(74) *Attorney, Agent, or Firm* — Wenderoth, Lind & Ponack, L.L.P.

(57) ABSTRACT

A head-up display includes a display device and a projection optical system; the projection optical system includes first and second optical elements arranged in order of an optical path from the image; and when optical paths corresponding to an upper end and a lower end of the virtual image are defined as an upper ray and a lower ray, respectively, and a diverging effect and a converging effect are defined as being negative and positive, respectively, the first and the second optical elements satisfy conditional expressions $P\_u1-P\_l1<0$ and $P\_u2-P\_l2>0$ (where $P\_u1$ denotes a local power of the first optical element acting on the upper ray, $P\_l1$ denotes a local power of the first optical element acting on the lower ray, $P\_u2$ denotes a local power of the second optical element acting on the upper ray, $P\_l2$ denotes a local power of the second optical element acting on the lower ray).

9 Claims, 5 Drawing Sheets

(51) Int. Cl.
  *G02B 13/18* (2006.01)
  *G02B 17/08* (2006.01)
(52) U.S. Cl.
  CPC ...... *G02B 17/08* (2013.01); *B60K 2370/1529* (2019.05); *B60K 2370/23* (2019.05); *B60K 2370/336* (2019.05); *G02B 2027/0118* (2013.01)
(58) Field of Classification Search
  CPC .... G02B 17/00–0896; B60K 35/00–06; B60K 2370/00–98; G03B 21/00–64; H04N 9/31–3197
  See application file for complete search history.

(56) References Cited

U.S. PATENT DOCUMENTS

2017/0359558 A1   12/2017  Harada et al.
2018/0259770 A1*  9/2018   Kuzuhara ............ G03B 21/142
2019/0225083 A1*  7/2019   Yatsu ................. G02B 27/0101

OTHER PUBLICATIONS

International Search Report dated May 28, 2019 in International (PCT) Application No. PCT/JP2019/007246.
International Preliminary Report on Patentability and Written Opinion of The International Searching Authority dated Dec. 10, 2020 in International (PCT) Application No. PCT/JP2019/007246.

* cited by examiner

Fig.4
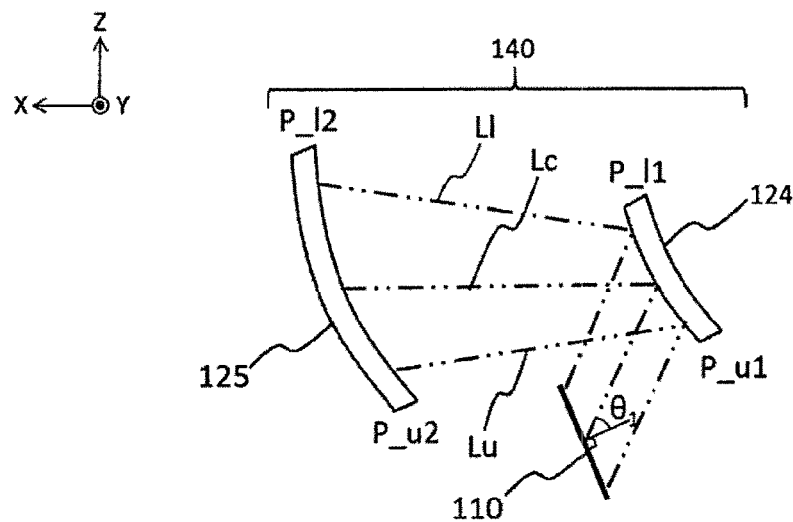
Fig.5
|  | P_u1 | P_l1 | P_u2 | P_l2 |
|---|---|---|---|---|
| No.1 | POSITIVE WEAK | POSITIVE STRONG | POSITIVE STRONG | POSITIVE WEAK |
| No.2 | POSITIVE WEAK | POSITIVE STRONG | POSITIVE | NEGATIVE |
| No.3 | POSITIVE WEAK | POSITIVE STRONG | NEGATIVE WEAK | NEGATIVE STRONG |
| No.4 | NEGATIVE | POSITIVE | POSITIVE STRONG | POSITIVE WEAK |
| No.5 | NEGATIVE | POSITIVE | POSITIVE | NEGATIVE |
| No.6 | NEGATIVE STRONG | NEGATIVE WEAK | POSITIVE STRONG | POSITIVE WEAK |
Fig.6
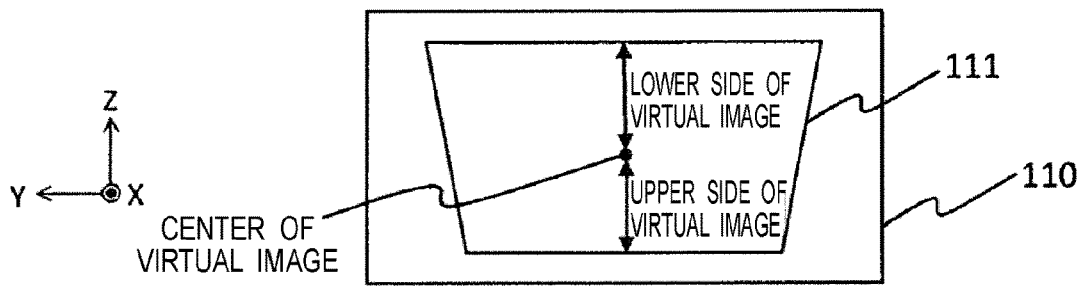

HEAD-UP DISPLAY AND MOBILE BODY EQUIPPED WITH HEAD-UP DISPLAY

CROSS-REFERENCE TO RELATED APPLICATIONS

This is a continuation application of International Application No. PCT/JP2019/007246, with an international filing date of Feb. 26, 2019, which claims priority of Japanese Patent Application No. 2018-105383 filed on May 31, 2018, the content of which is incorporated herein by reference.

BACKGROUND OF THE INVENTION

1. Technical Field

The present disclosure relates to a head-up display, and a mobile body equipped with a head-up display.

2. Description of Related Art

JP 2017-219755 A discloses that when a display screen of an LCD panel is viewed through a prism in a diagonal direction in a head-up display, an image displayed on the LCD panel is displayed and output as a virtual image inclined in a depth direction. In Patent Document 1, the chromatic aberration generated by the prism is corrected for each wavelength of RGB output at the stage of a display image, so that the same image as the original image without a color shift is output at the stage of RGB image composition through the prism.

SUMMARY

Since a conventional head-up display displays a virtual image along a road surface, a display image must significantly be inclined, which causes a contrast reduction of the virtual image. The present disclosure provides a head-up display capable of displaying a virtual image along a road surface without reducing a contrast of a display device, and a mobile body equipped with the head-up display.

The head-up display of the present disclosure is
a head-up display displaying an image as a virtual image to an observer,
the head-up display comprising:
a display device displaying the image; and
a projection optical system magnifying and projecting the image, the projection optical system including a first optical element and a second optical element arranged in order of an optical path from the image, wherein
when optical paths corresponding to an upper end and a lower end of the virtual image are defined as an upper ray and a lower ray, respectively, and
a diverging effect and a converging effect of the first optical element and the second optical element are defined as being negative and positive, respectively,
the first optical element and the second optical element satisfy the following conditional expressions (1), (2):

$$P\_u1 - P\_l1 < 0 \quad (1)$$

where
$P\_u1$ denotes a local power of the first optical element acting on the upper ray, and
$P\_l1$ denotes a local power of the first optical element acting on the lower ray; and $$P\_u2 - P\_l2 > 0 \quad (2)$$

where
$P\_u2$ denotes a local power of the second optical element acting on the upper ray, and
$P\_l2$ denotes a local power of the second optical element acting on the lower ray.

In the head-up display and the mobile body equipped with the head-up display in the present disclosure, these local positive and negative powers of the first optical element and the second optical element satisfy the conditional expressions (1), (2), and therefore, an inclination angle $|\theta_1|$ of a display device 110 relative to a reference ray Lc can be reduced. As a result, a contrast reduction of the display device 110 can be prevented, and a virtual image I can clearly be displayed along a road surface R.

BRIEF DESCRIPTION OF THE DRAWINGS

FIG. 4 is a diagram showing a configuration of a display device and a projection optical system of a head-up display according to a second embodiment.

FIG. 5 is a diagram showing combinations of local powers of a first optical element and a second optical element capable of satisfying conditional expressions (1), (2) and forming an image according to a third embodiment, FIG. 6 is a diagram for explaining upper and lower ranges of use of a virtual image according to another embodiment.

DETAILED EMBODIMENTS

Embodiments will now be described in detail with reference to the drawings as needed. It is noted that detailed description will not be provided more than necessary in some cases. For example, detailed description of already well-known facts and repeated description of substantially the same constituent elements may not be provided. This is for the purpose of avoiding unnecessary redundancy of the following description and facilitating understanding by those skilled in the art.

The accompanying drawings and the following description are provided by the present inventor(s) for sufficient understanding of the present disclosure by those skilled in the art, and it is not intended to limit the subject matter described in claims thereto.

First Embodiment

A first embodiment will now be described with reference to FIGS. 1 to 3.
[1-1 Configuration]
[1-1-1. Overall Configuration of Head-up Display]

Specific embodiments and examples of a head-up display 100 of the present disclosure will hereinafter be described with reference to the drawings.

Figure 1:
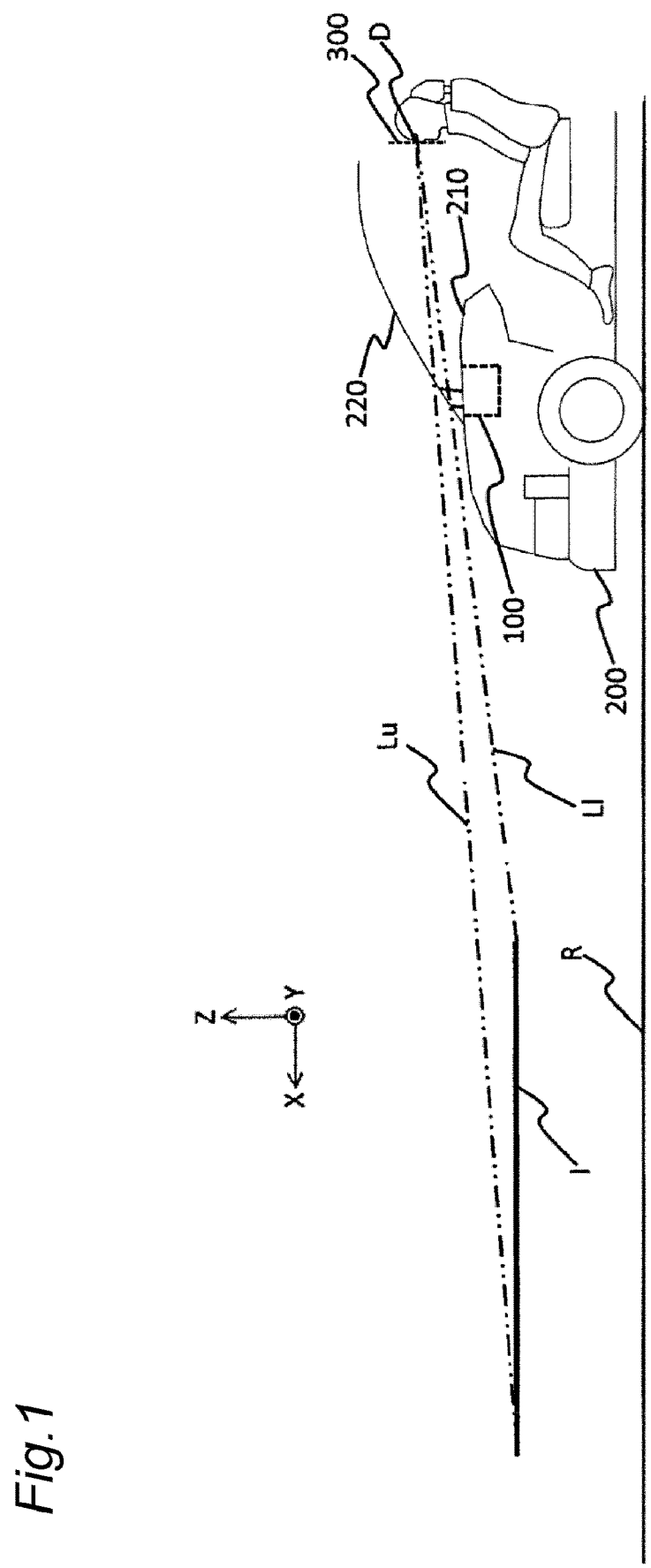
FIG. 1 is a diagram showing a cross section of a vehicle equipped with a head-up display according to a first embodiment.

FIG. 1 is a diagram showing a cross section of a vehicle 200 equipped with a head-up display 100 according to the present disclosure. As shown in FIG. 1, the head-up display 100 is disposed inside a dashboard 210 below a windshield 220 of the vehicle 200. An observer D recognizes an image projected from the head-up display 100 as a virtual image I.

In this embodiment, the virtual image I is displayed along a road surface R. By displaying the virtual image I along the road surface R in this way, a natural AR (Augmented Reality) display with a sense of depth can be implemented, and driver's cognition can be improved.

Figure 2:
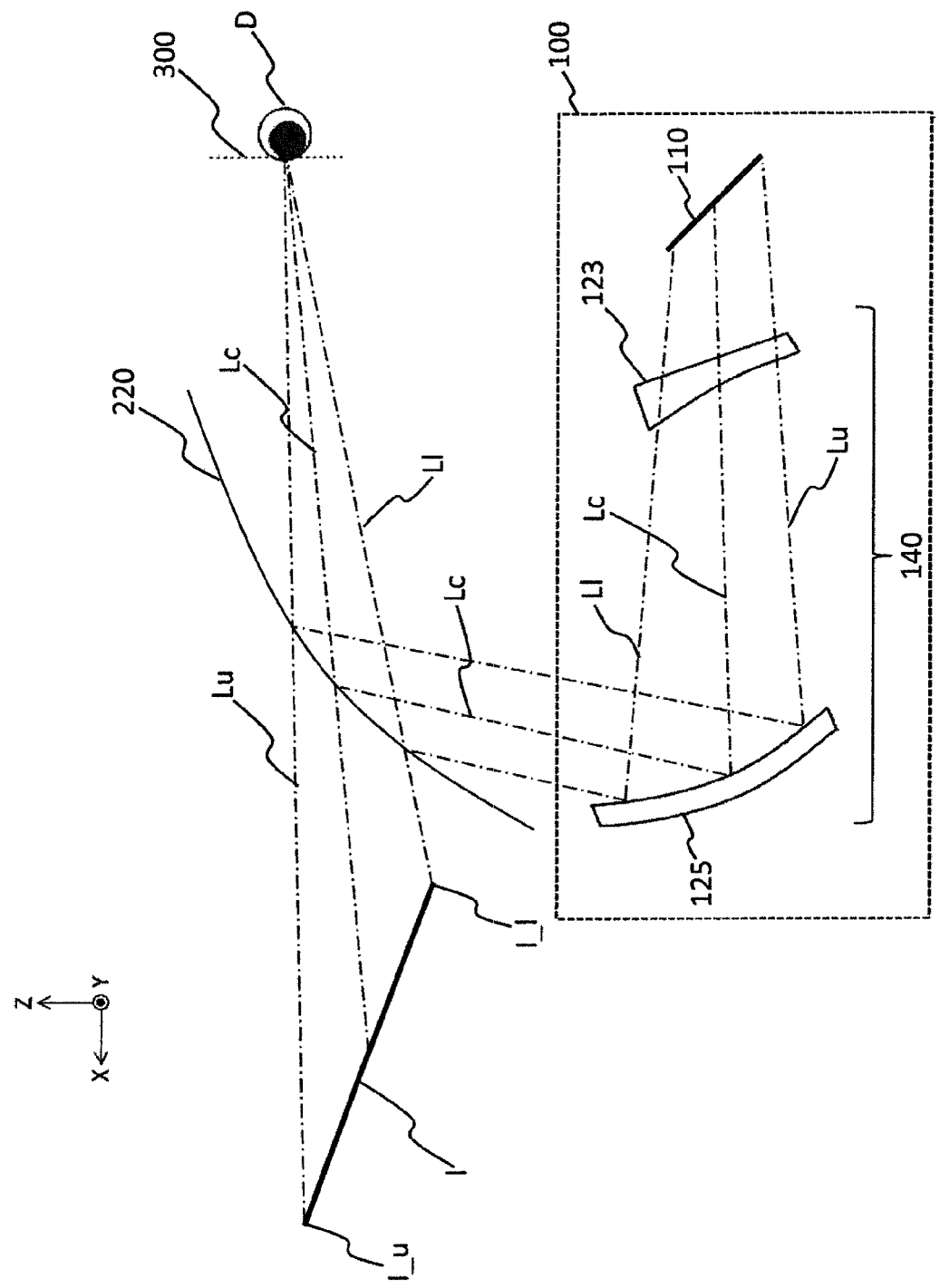
FIG. 2 is a schematic showing a configuration of the head-up display according to the first embodiment.

FIG. 2 is a schematic showing a configuration of the head-up display 100 according to this embodiment. FIG. 3 is a schematic for explaining a projection optical system of the head-up display 100 according to this embodiment.

As shown in FIG. 2, the head-up display 100 includes a display device 110 and a projection optical system 140. In the head-up display 100, the display device 110 is an optical member having diffusion characteristics, and an image displayed on the display device 110 is projected through a projection optical system 140 to the windshield 220. The projected light is reflected by the windshield 220 and guided to a viewpoint region 300 of the observer D. As a result, the head-up display 100 allows the observer D to visually recognize the virtual image I. In this case, a viewpoint is a principal point when the eyes of the observer D are considered as a lens, and the viewpoint region 300 is a region where the viewpoint of the observer D is located when the virtual image I can visually be recognized without lack.

In the present disclosure, a forward direction is a direction toward the windshield 220 of the vehicle 200 from the observer D. A backward direction is the direction opposite to the forward direction. A downward direction is a direction toward a ground on which the vehicle 200 runs. An upward direction is the direction opposite to the downward direction. An inner side is the passenger seat side when viewed from the observer D in the driver's seat. The outer side is in the direction opposite to the inner side.

As shown in FIG. 2, among light rays emitted from the display device 110 and among light rays reaching the center of the viewpoint region 300, a light ray corresponding to an upper end I_u of the virtual image I is defined as an upper ray Lu, and a light ray corresponding to a lower end I_l of the virtual image I is defined as a lower ray Ll. Among the light rays emitted from the display device 110, a light ray passing through a central portion of the virtual image I and reaching the center of the viewpoint region 300 is defined as a reference ray Lc. Therefore, when viewed from the observer D, the reference ray Lc corresponds to an optical path from the center of the virtual image I to the viewpoint of the observer D. The reference ray Lc visually recognized by the observer D actually reaches the observer D from the display device 110 via the optical system. Therefore, alight ray from the display device 110 to the observer D corresponding to the reference ray Lc emitted from the center of the virtual image I is also represented as the reference ray Lc. The optical path corresponding to these light rays is also represented as the reference ray Lc. It is assumed that the viewpoint of the observer D is at the center of the viewpoint region 300.

The display device 110 displays a display image under the control of a control part such as a CPU which is not shown. For the display device 110, for example, a liquid crystal display device with a backlight, an organic light-emitting diode, or a plasma display can be used. Alternatively, for the display device 110, an image may be generated by using a screen diffusing or reflecting a light and a projector or a scanning laser. The display device 110 can display various pieces of information such as a road traveling guidance display, a distance to a vehicle ahead, a remaining vehicle battery level, and a current vehicle speed. The display device 110 can electronically distort an image in advance depending on a distortion generated in the projection optical system 140 or the windshield 220 and a position of the observer D acquired by a camera not shown, so as to allow the observer D to visually recognize the good virtual image I. Additionally, the display device 110 can shift display pixels of multiple wavelengths for each display position in advance depending on chromatic aberration generated in the projection optical system 140, so as to allow the observer D to visually recognize the good virtual image I.

The projection optical system 140 includes a free-form surface lens 123 serving as a first optical element having a negative power and a free-form surface mirror 125 serving as a second optical element having a positive power. The negative power means a diverging effect, and the positive power means a converging effect. In the projection optical system 140, an image magnified by the free-form surface lens 123 is reflected via the free-form surface mirror 125 and thereby projected on the windshield 220.

[1-1-2. Configuration of Display Device and Projection Optical System]

In this embodiment, the virtual image I is inclined relative to the line of sight of the observer D and is displayed along the road surface R. To display the virtual image I in an inclined manner as described above, as shown in FIG. 3, the display device 110 is inclined counterclockwise at an angle $|\theta_1|$ relative to the reference ray Lc.

In the projection optical system 140, the free-form surface lens 123 having a negative power and the free-form surface mirror 125 having a positive power are arranged in order of the optical path from the display device 110. The projection optical system 140 is formed as an optical system called a telephoto type due to the free-form surface lens 123 and the free-form surface mirror 125.

However, unlike the conventional telephoto type optical system, the free-form surface lens 123 and the free-form surface mirror 125 have partially varying curvature so that a portion corresponding to the lower ray Ll and a portion corresponding to the upper ray Lu are different in the negative power and the positive power.

Figure 3:
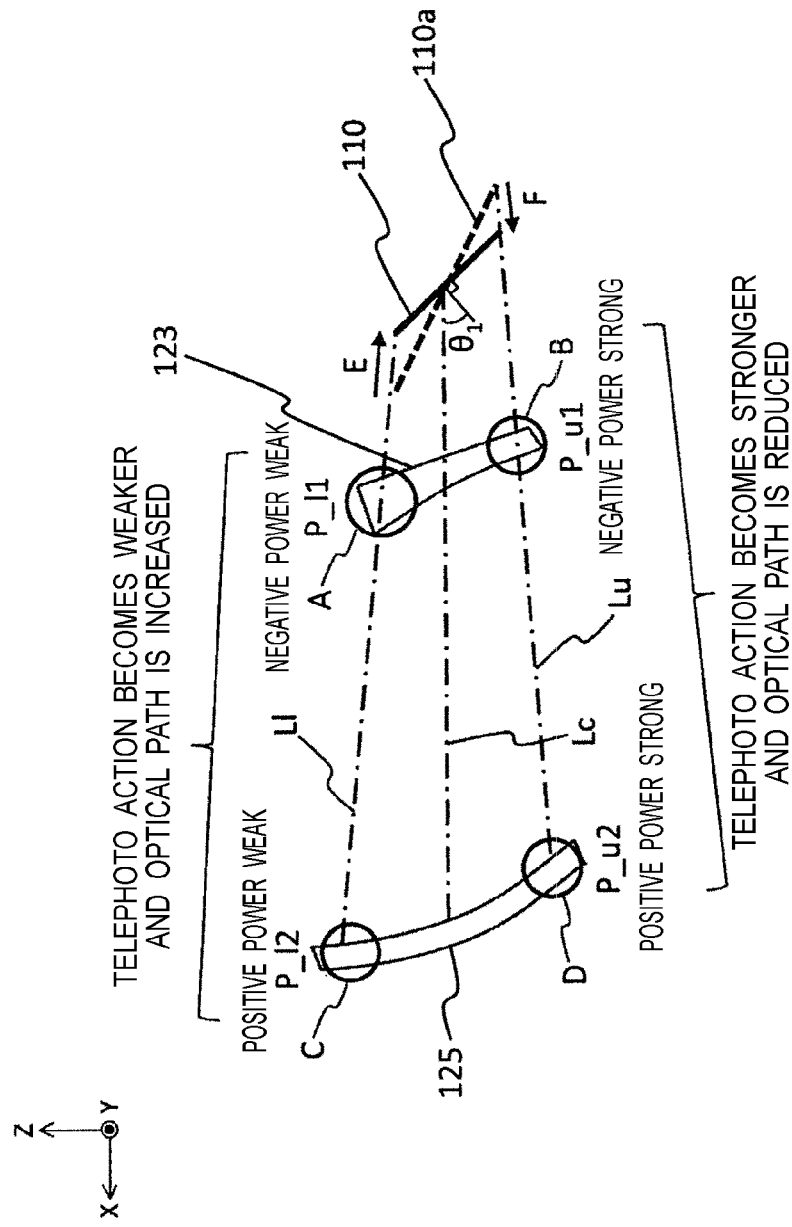
FIG. 3 is a schematic for explaining a projection optical system of the head-up display according to the first embodiment.

The free-form surface lens 123 is configured such that a local negative power P_l1 of a portion acting on the lower ray Ll indicated by a circle A in FIG. 3 becomes weaker than a local negative power P_u1 of a portion acting on the upper ray Lu indicated by a circle B. In the free-form surface lens 123, the negative power is smoothly changed from the portion corresponding to the upper ray Lu to the portion corresponding to the lower ray Ll.

The free-form surface mirror 125 is configured such that a local positive power P_l2 of a portion acting on the lower ray Ll indicated by a circle C in FIG. 3 becomes weaker than a local positive power P_u2 of a portion acting on the upper ray Lu indicated by a circle D. In the free-form surface mirror 125, the positive power is smoothly changed from the portion corresponding to the upper ray Lu to the portion corresponding to the lower ray Ll.

As described above, the following conditional expressions (1), (2) are satisfied by the local negative power P_l1 of the portion acting on the lower ray Ll and the local negative power P_u1 of the portion acting on the upper ray Lu in the free-form surface lens 123, as well as the local positive power P_l2 of the portion acting on the lower ray Ll and the local positive power P_u2 of the portion acting on the upper ray Lu in the free-form surface mirror 125.

$$P\_u1 - P\_l1 < 0 \qquad (1)$$

$$P\_u2 - P\_l2 > 0 \qquad (2)$$

Since the free-form surface lens 123 and the free-form surface mirror 125 satisfy the conditional expressions (1) and (2), the telephoto action becomes weaker and the optical path is increased in the portion acting on the lower ray Ll. The telephoto action becomes stronger and the optical path is reduced in the portion acting on the upper ray Lu.

As a result, in the display device 110, as compared to a display device 110a in a conventional position indicated by a dotted line in FIG. 3, the portion corresponding to the lower ray Ll is moved backward and away from the free-form surface lens 123 as indicated by an arrow E, while the portion corresponding to the upper ray Lu is moved forward and closer to the free-form surface lens 123 as indicated by an arrow F. Therefore, the inclination angle |θ₁| of the display device 110 relative to the reference ray Lc becomes smaller than the inclination angle of the display device 110a at the conventional position.

The projection optical system 140 according to this embodiment can reduce the inclination angle |θ1| of the display device 110 relative to the reference ray Lc in this way and therefore can prevent a contrast reduction of the display device 110.

According to this embodiment, the virtual image I can be displayed along the road surface R without reducing the contrast, and the natural and clear AR display with a sense of depth can be implemented. Therefore, the driver's cognition can further be improved.

[1-2. Effects Etc.]

The head-up display 100 described as an example of the head-up display according to the first embodiment is a head-up display allowing the observer D to visually recognize the virtual image I. The head-up display 100 includes the display device 110 that is an example of a display device and the projection optical system 140. The projection optical system 140 has the free-form surface lens 123 serving as the first optical element and the free-form surface mirror 125 serving as the second optical element in order of the optical path from the display device 110. The optical paths corresponding to the upper end and the lower end of the virtual image I are defined as the upper ray Lu and the lower ray Ll, respectively, and the local negative powers of the portions acting on the lower ray Ll and the upper ray Lu in the free-form lens 123 are defined as P_l1 and P_u1, respectively. The local positive powers of the portions acting on the lower ray Ll and the upper ray Lu in the free-form surface mirror 125 are defined as P_l2 and P_u2, respectively. These local positive and negative powers in the free-form surface lens 123 and the free-form surface mirror 125 satisfy the following conditional expressions (1), (2).

$$P\_u1 - P\_l1 < 0 \qquad (1)$$

$$P\_u2 - P\_l2 > 0 \qquad (2)$$

According to the head-up display of the first embodiment, these local positive and negative powers of the free-form surface lens 123 and the free-form surface mirror 125 satisfy the conditional expressions (1), (2), and therefore, the inclination angle |θ₁| of the display device 110 relative to the reference ray Lc can be reduced. As a result, a contrast reduction of the display device 110 can be prevented, and the virtual image I can clearly be displayed along the road surface R.

Second Embodiment

A second embodiment will be described with reference to FIG. 4.

[2-1. Configuration]

FIG. 4 is a diagram showing configurations of the display device 110 and the projection optical system 140 in the head-up display 100 according to the second embodiment. As shown in FIG. 4, the head-up display 100 of this embodiment includes a free-form surface mirror 124 as the first optical element instead of the free-form surface lens 123.

In this embodiment, the free-form surface mirror 124 is configured such that the local negative power P_l1 of the portion acting on the lower ray Ll becomes weaker than the local negative power P_u1 of the portion acting on the upper ray Lu. In the free-form surface mirror 124, the negative power is smoothly changed from the portion corresponding to the upper ray Lu to the portion corresponding to the lower ray Ll.

As with the first embodiment, the free-form surface mirror 125 is configured such that the local positive power P_l2 of the portion acting on the lower ray Ll becomes weaker than the local positive power P_u2 of the portion acting on the upper ray Lu. In the free-form surface mirror 125, the positive power is smoothly changed from the portion corresponding to the upper ray Lu to the portion corresponding to the lower ray Ll.

As described above, the following conditional expressions (1), (2) are satisfied by the local negative power P_l1 of the portion acting on the lower ray Ll and the local negative power P_u1 of the portion acting on the upper ray Lu in the free-form surface mirror 124, as well as the local positive power P_l2 of the portion acting on the lower ray Ll and the local positive power P_u2 of the portion acting on the upper ray Lu in the free-form surface mirror 125.

$$P\_u1 - P\_l1 < 0 \qquad (1)$$

$$P\_u2 - P\_l2 > 0 \qquad (2)$$

Since the free-form surface mirror 124 and the free-form surface mirror 125 satisfy the conditional expressions (1) and (2), the telephoto action becomes weaker and the optical path is increased in the portion acting on the lower ray Ll. The telephoto action becomes stronger and the optical path is reduced in the portion acting on the upper ray Lu.

As a result, in the display device 110, as compared to a display device in which the local power difference as described above is not generated in the free-form surface mirror 124 and the free-form surface mirror 125, the portion corresponding to the lower ray Ll is moved backward and away from the free-form surface mirror 124, while the portion corresponding to the upper ray Lu is moved forward and closer to the free-form surface mirror 124. Therefore, the inclination angle |θ₁| of the display device 110 relative to the reference ray Lc becomes smaller than the inclination angle of the display device in which the local power difference as described above is not generated in the free-form surface mirror 124 and the free-form surface mirror 125.

The projection optical system 140 according to this embodiment can reduce the inclination angle |θ₁| of the display device 110 relative to the reference ray Lc in this way and therefore can prevent a contrast reduction of the display device 110.

According to this embodiment, the virtual image I can be displayed along the road surface R without reducing the contrast, and the natural and clear AR display with a sense of depth can be implemented. Therefore, the driver's cognition can further be improved.

[2-2. Effects Etc.]

The head-up display 100 described as an example of the head-up display according to the second embodiment is a head-up display allowing the observer D to visually recognize the virtual image I. The head-up display 100 includes the display device 110 that is an example of a display device and the projection optical system 140. The projection optical system 140 has the free-form surface mirror 124 serving as the first optical element and the free-form surface mirror 125 serving as the second optical element in order of the optical path from the display device 110. The optical paths corresponding to the upper end and the lower end of the virtual image I are defined as the upper ray Lu and the lower ray Ll, respectively, and the local negative powers of the portions acting on the lower ray Ll and the upper ray Lu in the free-form mirror 124 are defined as P_l1 and P_u1, respectively. The local positive powers of the portions acting on the lower ray Ll and the upper ray Lu in the free-form surface mirror 125 are defined as P_l2 and P_u2, respectively. These local positive and negative powers in the free-form surface mirror 124 and the free-form surface mirror 125 satisfy the following conditional expressions (1), (2).

$$P\_u1 - P\_l1 < 0 \quad (1)$$

$$P\_u2 - P\_l2 > 0 \quad (2)$$

According to the head-up display of the second embodiment, these local positive and negative powers of the free-form surface mirror 124 and the free-form surface mirror 125 satisfy the conditional expressions (1), (2), and therefore, the inclination angle $|\theta_1|$ of the display device 110 relative to the reference ray Lc can be reduced. As a result, a reduction in the contrast of the display device 110 can be prevented, and the virtual image I can dearly be displayed along the road surface R.

Third Embodiment

A third embodiment will be described with reference to FIG. 5.

[3-1. Combination of Projection Optical Systems]

In the embodiments described above, the free-form surface lens 123 or the free-form surface mirror 124 is configured such that the local negative power P_l1 of the portion acting on the lower ray Ll is weak while the local negative power P_u1 of the portion acting on the upper ray Lu is strong. Additionally, the free-form surface mirror 125 is configured such that the local positive power P_l2 of the portion acting on the lower ray Ll is weak while the local positive power P_u2 of the portion acting on the upper ray Lu is strong.

However, the configuration for generating a difference in the local power in the projection optical system 140 is not limited to the combination as described above, and other combinations capable of satisfying the conditional expressions (1), (2) and forming an image may be used.

FIG. 5 is a diagram showing combinations of local powers of the first optical element and the second optical element capable of satisfying conditional expressions (1), (2) and forming an image. In FIG. 5, the combination of No. 6 is the combination of the first embodiment and the second embodiment. In FIG. 5, the negative power is simply represented as "Negative", and the positive power is simply represented as "Positive".

[3-1-1. No. 1]

The combination of No. 1 shown in FIG. 5 is an example in which the second optical element is configured as an optical element having a positive power as in the embodiments described above such that the local positive power P_l2 of the portion acting on the lower ray Ll is weak, while the local positive power P_u2 of the portion acting on the upper ray Lu is strong.

However, unlike the embodiments described above, the first optical element is configured as an optical element having a positive power such that the local positive power P_l1 of the portion acting on the lower ray Ll is strong, while the local positive power P_u1 of the portion acting on the upper ray Lu is weak.

In the case of this configuration, the telephoto type optical system is not formed, and the principal point is moved toward the display device 110 as compared to the telephoto type optical system. Particularly, since the local positive power P_l1 of the portion acting on the lower ray Ll in the first optical element is stronger than the local positive power P_u1 of the portion acting on the upper ray Lu, the principal point on the lower ray Ll side is moved toward the display device 110 as compared to the upper ray Lu. As a result, the portion corresponding to the lower ray Ll is moved backward and away from the first optical element in the display device 110, and the inclination angle $|\theta_1|$ of the display device 110 relative to the reference ray Lc becomes smaller than the inclination angle of the display device in which the local power difference as described above is not generated in the first optical element and the second optical element.

[3-1-2. No. 2]

In the combination of No. 2 shown in FIG. 5, the first optical element has the same configuration as No. 1. However, the second optical element is configured such that the portion acting on the lower ray Ll has the local negative power P_l2 while the portion acting on the upper ray Lu has the local positive power P_u2 in this example.

In the case of this configuration, the telephoto type optical system is not formed, and the principal point on the lower ray Ll side is further moved toward the display device 110 as compared to the case of No. 1. As a result, the portion corresponding to the lower ray Ll is moved backward and away from the first optical element in the display device 110, and the inclination angle $|\theta_1|$ of the display device 110 relative to the reference ray Lc becomes smaller than the inclination angle of the display device in which the local power difference as described above is not generated in the first optical element and the second optical element.

[3-1-3. No. 3]

In the combination of No. 3 shown in FIG. 5, the first optical element has the same configuration as No. 1. However, the second optical element is configured as an optical element having negative power such that the local negative power P_l2 of the portion acting on the lower ray Ll becomes stronger than the local negative power P_u2 of the portion acting on the upper ray Lu in this example.

In the case of this configuration, the telephoto type optical system is not formed, and the principal point on the lower ray Ll side is moved toward the display device 110 as compared to the principal point on the upper ray Lu side. As a result, the portion corresponding to the lower ray Ll is moved backward and away from the first optical element in the display device 110, and the inclination angle $|\theta_1|$ of the display device 110 relative to the reference ray Lc becomes smaller than the inclination angle of the display device in which the local power difference as described above is not generated in the first optical element and the second optical element.

[3-1-4. No. 4]

The combination of No. 4 shown in FIG. 5 is an example in which the second optical element is configured as an optical element having a positive power as in the embodiments described above such that the local positive power P_l2 of the portion acting on the lower ray Ll is weak, while the local positive power P_u2 of the portion acting on the upper ray Lu is strong.

However, the first optical element is configured such that the portion acting on the lower ray Ll has the local positive power P_l2 while the portion acting on the upper ray Lu has the local negative power P_u2 in this example.

In the case of this configuration, the telephoto action is applied to the portion corresponding to the upper ray Lu, and the optical path of the upper ray Lu is reduced as compared to the optical path of the lower ray Ll. As a result, the portion corresponding to the upper ray Lu is moved forward and closer to the first optical element in the display device 110, and the inclination angle $|\theta_1|$ of the display device 110 relative to the reference ray Lc becomes smaller than the inclination angle of the display device in which the local power difference as described above is not generated in the first optical element and the second optical element.

[3-1-5. No. 5]

In the combination of No. 5 shown in FIG. 5, the first optical element has the same configuration as No. 4. However, the second optical element is configured such that the portion acting on the lower ray Ll has the local negative power P_l2 while the portion acting on the upper ray Lu has the local positive power P_u2 in this example.

In the case of this configuration, the telephoto action is applied to the portion corresponding to the upper ray Lu, and the optical path of the upper ray Lu is reduced as compared to the optical path of the lower ray Ll. As a result, the portion corresponding to the upper ray Lu is moved forward and closer to the first optical element in the display device 110, and the inclination angle $|\theta_1|$ of the display device 110 relative to the reference ray Lc becomes smaller than the inclination angle of the display device in which the local power difference as described above is not generated in the first optical element and the second optical element.

As described above, the configuration for generating a difference in the local power in the first optical element and the second optical element is not limited to the combination (No. 6 of FIG. 5) as described in the first and second embodiments, and the combinations described as Nos. 1 to No. 5 of FIG. 5 are available as long as the combinations can satisfy the conditional expressions (1), (2) and form an image.

In any of the combinations shown in FIG. 5, the projection optical system 140 according to this embodiment can reduce the inclination angle $|\theta_1|$ of the display device 110 relative to the reference ray Lc and therefore can prevent a contrast reduction of the display device 110.

According to this embodiment, the virtual image I can be displayed along the road surface R without reducing the contrast, and the natural and clear AR display with a sense of depth can be implemented. Therefore, the driver's cognition can further be improved.

[3-2. Effects Etc.]

The head-up display 100 described as an example of the head-up display according to the third embodiment is a head-up display allowing the observer D to visually recognize the virtual image I. The head-up display 100 includes the display device 110 that is an example of a display device and the projection optical system 140. The projection optical system 140 has the first optical element and the second optical element in order of the optical path from the display device 110. The optical paths corresponding to the upper end and the lower end of the virtual image I are defined as the upper ray Lu and the lower ray Ll, respectively, and the local powers of the portions acting on the lower ray Ll and the upper ray Lu in the first optical element are defined as P_l1 and P_u1, respectively. The local powers of the portions acting on the lower ray Ll and the upper ray Lu in the second optical element are defined as P_l2 and P_u2, respectively. These local powers in the first optical element and the second optical element satisfy the following conditional expressions (1), (2).

$$P\_u1 - P\_l1 < 0 \quad (1)$$

$$P\_u2 - P\_l2 > 0 \quad (2)$$

According to the head-up display of the third embodiment, these local positive and negative powers of the first optical element and the second optical element satisfy the conditional expressions (1), (2), and therefore, the inclination angle $|\theta_1|$ of the display device 110 relative to the reference ray Lc can be reduced. As a result, a contrast reduction of the display device 110 can be prevented, and the virtual image I can clearly be displayed along the road surface R.

Other Embodiments

As described above, the first to third embodiments have been described as exemplification of the techniques disclosed in this application. However, the techniques in the present disclosure are not limited thereto and are also applicable to embodiments in which modifications, replacements, additions, omissions, etc. are appropriately made. Additionally, the constituent elements described in the first to third embodiments can be combined to provide a new embodiment.

FIG. 6 shows a display image 111 displayed on the display device 110. For example, to form the virtual image I seen as a rectangular image by the observer D, as shown in FIG. 6, the display image 111 displayed on the display device 110 has a trapezoidal shape with a narrow width on the lower side and a wide width on the upper side corresponding to the lower side of the virtual image I. Since the display device 110 is inclined relative to the reference ray Lc as described above, a region corresponding to the up-down direction of the virtual image I is wider on the lower side of the virtual image than on the upper side of the virtual image. Therefore, the display area of the display image 111 has a range of use corresponding to the lower side of the virtual image I wider than a range of use corresponding to the upper side of the virtual image I with respect to the center of the virtual image I. By forming the display image 111 in this way, the rectangular virtual image I is seen along the road surface R by the observer D.

Figure 7:
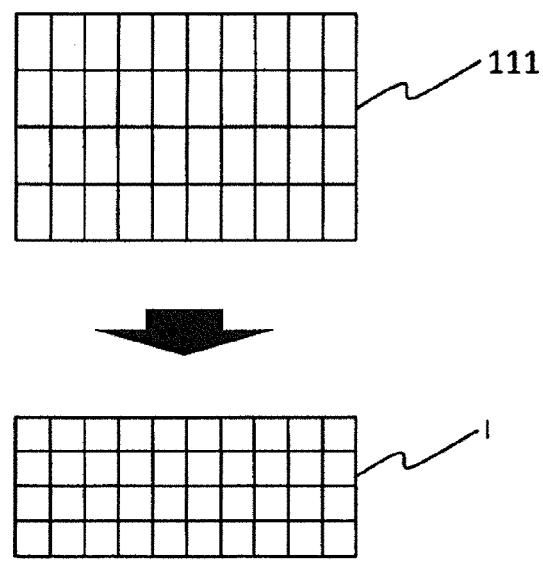
FIG. 7 is a diagram for explaining a pitch of horizontal pixels and a pitch of vertical pixels according to another embodiment.

FIG. 7 is a diagram showing a pitch of pixels of the display image 111 on the display device 110. As shown in FIG. 7, in this embodiment, the pitch of vertical pixels is made larger than the pitch of horizontal pixels. As described above, since the display device 110 is inclined relative to the reference ray Lc, the number of vertical pixels becomes larger in the virtual image I. Therefore, an area of use increases in the vertical direction. Therefore, as shown in FIG. 7, by making the pitch of vertical pixels larger than the pitch of horizontal pixels in the display image 111, the numbers of vertical and horizontal pixels can be made equal in the virtual image I. In other words, by making the pixel pitch smaller in the direction corresponding to the left-right direction of the virtual image I than in the direction corresponding to the up-down direction of the virtual image I in the display image of the display device 110, the numbers of vertical and horizontal pixels can be made equal in the virtual image I.

To achieve such a pixel pitch, for example, a lens sheet and a lenticular range sheet may be included as a screen in a type of a display device projecting a laser on a screen, and the pitch of this screen may be defined as shown in FIG. 7. In this case, the pixel pitch corresponds to the pitch of the screen.

The mobile body may be a vehicle such as an automobile, a motorcycle having a windshield, a train, a bus, an airplane, etc., and the head-up display 100 of the present disclosure can be mounted on these moving bodies.

Although the head-up display 100 is disposed below the dashboard 210 in the first to third embodiments, the head-up display 100 may be disposed above the dashboard 210.

Since the embodiments described above are intended to illustrate the techniques in the present disclosure, various modifications, replacements, additions, omissions, etc. can be made within the claims and the scope equivalent thereto.

Although the virtual image I is displayed along the road surface R in the first to third embodiments, a sense of depth can also be expressed by inclining the virtual image I relative to the line of sight of the observer D by 45 degrees or more.

Overview of Embodiments (1) The head-up display of the present disclosure is a head-up display displaying an image as a virtual image to an observer, the head-up display including: a display device displaying the image; and a projection optical system magnifying and projecting the image, the projection optical system including a first optical element and a second optical element arranged in order of an optical path from the image, wherein when optical paths corresponding to an upper end and a lower end of the virtual image are defined as an upper ray and a lower ray, respectively, and a diverging effect and a converging effect of the first optical element and the second optical element are defined as being negative and positive, respectively, the first optical element and the second optical element satisfy the following conditional expressions (1), (2):

$$P\_u1 - P\_l1 < 0 \quad (1)$$

where

P_u1 denotes a local power of the first optical element acting on the upper ray, and P_l1 denotes a local power of the first optical element acting on the lower ray; and $$P\_u2 - P\_l2 > 0 \quad (2)$$

where

P_u2 denotes a local power of the second optical element acting on the upper ray, and P_l2 denotes a local power of the second optical element acting on the lower ray.

By satisfying the conditional expressions as described above, the inclination angle of the display device relative to a reference ray can be reduced. As a result, a contrast reduction of the display device can be prevented, and the virtual image can clearly be displayed along a road surface.

(2) In the head-up display of (1), a display area of the display image has a range of use corresponding to the lower side of the virtual image wider than a range of use corresponding to the upper side of the virtual image with respect to the center of the virtual image. Therefore, when the observer observes the virtual image, the observer can observe the virtual image having a natural shape without distortion.

(3) In the head-up display of (1) or (2), the display image of the display device has a pixel pitch in a direction corresponding to a left-right direction of the virtual image smaller than a pixel pitch in a direction corresponding to an up-down direction of the virtual image. Therefore, when the observer observes the virtual image, the observer can observe the virtual image in which the vertical and horizontal pixel numbers are the same.

(4) In the head-up display of any one of (1) to (3), the first optical element is a free-form surface lens. Therefore, the head-up display can be configured such that the local powers acting on the upper ray and the lower ray satisfy the conditional expressions (1), (2).

(5) In the head-up display of (1) to (3), the first optical element is a free-form surface mirror. Therefore, the head-up display can be configured such that the local powers acting on the upper ray and the lower ray satisfy the conditional expressions (1), (2).

(6) In the head-up display of (1) to (5), the first optical element has a diverging effect. Therefore, the head-up display can be configured such that the local powers acting on the upper ray and the lower ray satisfy the conditional expressions (1), (2).

(7) In the head-up display of (1) to (6), the second optical element is a free-form surface mirror. Therefore, the head-up display can be configured such that the local powers acting on the upper ray and the lower ray satisfy the conditional expressions (1), (2).

(8) A mobile body of the present disclosure is a mobile body equipped with the head-up display of (1) to (7). Therefore, the present disclosure can provide the mobile body capable of clearly displaying a virtual image along a road surface etc. without reducing the contrast of the display device.

INDUSTRIAL APPLICABILITY

The present disclosure is applicable to a display device such as a liquid crystal display, and a head-up display using a projection optical system such as a free-form surface lens or a free-form surface mirror. Specifically, the present disclosure is applicable to a head-up display for a vehicle etc. The present disclosure is also applicable to a mobile body such as a vehicle equipped with this head-up display.

The invention claimed is:

1. A head-up display displaying an image as a virtual image to an observer, the head-up display comprising:

a display device displaying the image; and a projection optical system magnifying and projecting the image, wherein the projection optical system includes a first optical element and a second optical element arranged in order of an optical path from the image, and wherein when optical paths corresponding to an upper end and a lower end of the virtual image are defined as an upper ray and a lower ray, respectively, and a diverging effect and a converging effect of the first optical element and the second optical element are defined as being negative and positive, respectively, the first optical element and the second optical element satisfy the following conditional expressions (1), (2):

$$P\_u1 - P\_l1 < 0 \tag{1}$$

where

P_u1 denotes a local power of the first optical element acting on the upper ray, and P_l1 denotes a local power of the first optical element acting on the lower ray; and $$P\_u2 - P\_l2 > 0 \tag{2}$$

where

P_u2 denotes a local power of the second optical element acting on the upper ray, and P_l2 denotes a local power of the second optical element acting on the lower ray.

2. The head-up display according to claim 1, wherein a display area of the display image has a range of use corresponding to the lower side of the virtual image wider than a range of use corresponding to the upper side of the virtual image with respect to the center of the virtual image.

3. The head-up display according to claim 1, wherein the display image of the display device has a pixel pitch in a direction corresponding to a left-right direction of the virtual image smaller than a pixel pitch in a direction corresponding to an up-down direction of the virtual image.

4. The head-up display according to claim 1, wherein the first optical element is a free-form surface lens.

5. The head-up display according to claim 1, wherein the first optical element is a free-form surface mirror.

6. The head-up display according to claim 1, wherein the first optical element has a diverging effect.

7. The head-up display according to claim 1, wherein the second optical element is a free-form surface mirror.

8. The head-up display according to claim 1, wherein the virtual image is inclined by 45 degrees or more relative to the line of sight of the observer.

9. A mobile body equipped with the head-up display according to claim 1.

* * * * *